US009503546B2

(12) United States Patent
Othily et al.

(10) Patent No.: US 9,503,546 B2
(45) Date of Patent: Nov. 22, 2016

(54) METHOD FOR CONNECTING TO ONE ANOTHER COMMUNICATING OBJECTS IN WHICH USER PROFILES ARE STORED, AND COMMUNICATING OBJECT CORRESPONDING THERETO

(71) Applicant: SECOND BRIDGE, Paris (FR)

(72) Inventors: Jerome Othily, Paris (FR); Marc Ganouna, Los Angeles, CA (US)

(73) Assignee: SECOND BRIDGE, Paris (FR)

( * ) Notice: Subject to any disclaimer, the term of this patent is extended or adjusted under 35 U.S.C. 154(b) by 247 days.

(21) Appl. No.: 14/048,507

(22) Filed: Oct. 8, 2013

(65) Prior Publication Data

US 2014/0297747 A1    Oct. 2, 2014

(30) Foreign Application Priority Data

Mar. 28, 2013   (FR) ...................................... 13 52804

(51) Int. Cl.
| | |
|---|---|
| G06F 15/16 | (2006.01) |
| H04L 29/08 | (2006.01) |
| H04W 48/20 | (2009.01) |
| G06Q 10/10 | (2012.01) |

(52) U.S. Cl.
CPC ........... *H04L 67/306* (2013.01); *G06Q 10/107* (2013.01); *H04L 29/08* (2013.01); *H04L 67/22* (2013.01); *H04W 48/20* (2013.01)

(58) Field of Classification Search
CPC ...... H04L 67/306; H04L 67/22; H04L 29/08
USPC ................. 709/202–203, 204–205, 206–207
See application file for complete search history.

(56) References Cited

U.S. PATENT DOCUMENTS

| | | | |
|---|---|---|---|
| 5,959,568 A | 9/1999 | Woolley | |
| 7,046,718 B1* | 5/2006 | Yung et al. | 375/145 |
| 9,049,259 B2* | 6/2015 | Rathod | G06Q 50/01 |
| 2006/0192709 A1* | 8/2006 | Schantz et al. | 342/125 |
| 2007/0282621 A1 | 12/2007 | Altman et al. | |
| 2008/0096580 A1* | 4/2008 | Montemurro | 455/456.1 |
| 2008/0140650 A1* | 6/2008 | Stackpole | 707/5 |
| 2009/0125230 A1 | 5/2009 | Sullivan | |
| 2009/0181653 A1* | 7/2009 | Alharayeri | 455/414.1 |
| 2011/0014897 A1 | 1/2011 | Finucan | |
| 2011/0208822 A1* | 8/2011 | Rathod | G06Q 30/02 709/206 |
| 2011/0276396 A1* | 11/2011 | Rathod | H04L 67/306 709/203 |
| 2011/0320536 A1* | 12/2011 | Lobb et al. | 709/205 |
| 2012/0226749 A1* | 9/2012 | Dale | G06Q 50/01 709/204 |
| 2013/0073389 A1* | 3/2013 | Heath | G06Q 50/01 709/204 |

(Continued)

*Primary Examiner* — Bharat N Barot
(74) *Attorney, Agent, or Firm* — Im IP Law PLLC; C. Andrew Im (57) ABSTRACT

A method for connecting to users using at least two communicating objects comprises the step of creating a user account, associating the user account to profile accounts, such as professional and/or social network accounts and/or an account memorized in a customer data base. The user accounts and the associated profile accounts of all the users are incorporated into a general data base. The detecting communication objects detects detectable communicating objects and exchanges fields of the user accounts and/or associated profile accounts, the detection keys and the search keys with each other. Common keys between the search keys of the detecting communicating object and the detection keys of a detected communicating object are identified, the user is notified, and the two communicating objects are connected to each other.

16 Claims, 4 Drawing Sheets

(56) References Cited

U.S. PATENT DOCUMENTS

2013/0325964 A1* 12/2013 Berberat .................. 709/204
2014/0022341 A1* 1/2014 Minemura .................. 348/43
2014/0025688 A1* 1/2014 Andler .................. G06Q 50/01
  707/748
2015/0039524 A1* 2/2015 Leach .................. G06Q 50/01
  709/204

* cited by examiner

METHOD FOR CONNECTING TO ONE ANOTHER COMMUNICATING OBJECTS IN WHICH USER PROFILES ARE STORED, AND COMMUNICATING OBJECT CORRESPONDING THERETO

RELATED APPLICATIONS

This application claims priority from French Patent Application No. 13 52804 filed Mar. 28, 2013, which is incorporated herein by reference in its entirety.

TECHNICAL FIELD OF THE INVENTION

The invention relates to a method for connecting to one another communicating objects in which user profiles are stored. The invention finds a particularly advantageous, but nonexclusive, application in the field of social networks such as business or personal networks.

STATE OF THE ART

Online social networks, such as LinkedIn or Viadeo, are known which make it possible to build one's professional network. These networks are used for all that concerns professional life, i.e. in particular for searching a job, employers, service providers, for developing a business, etc.

These networks facilitating the relationships between their members are based on the direct or indirect connection of their users to one another. Anyway, for contacting a user, it is necessary to know her/him beforehand or to get one of her/his contacts to intervene.

These networks however remain completely virtual so that it is not possible for the users to know whether they have already met in their real life another network member having common interests, for example on such opportunities as a professional exhibition or even within their own company.

There is thus a need for automatically organizing one's professional contacts according to the real activity of the users of professional social networks.

OBJECT OF THE INVENTION

The object of the invention is in particular to meet this need. The invention thus proposes a method for connecting at least two communicating objects to one another, which method is characterized in that it comprises the following steps of:
  creating a user account including at least one field concerning one single identifier of the user corresponding to the communicating object thereof,
  associating to the user account profile accounts such as professional and/or social network accounts and/or an account memorized in a customer data base,
  incorporating, into a general data base, the user accounts and the associated profile accounts of all the users,
  determining search keys for communicating objects corresponding to fields of the user account and/or the associated profile accounts for communicating objects sought by the communicating object of a user,
  determining detection keys for the communicating object corresponding to the fields of the user account and/or the associated profile accounts whereby the communicating object agrees to be detected by other communicating objects,
  detecting, via a detecting communicating object, listening communicating objects, i.e. communicating objects able to be detected, within the framework of an authenticated and protected connection without the intervention to the user of the detecting communicating object nor the users of detectable communicating objects,
  exchanging fields of the user accounts and/or associated profile accounts, as well as the detection and search keys between the detecting communicating object and the detected communicating objects,
  identifying common keys between the search keys for the detecting communicating object and the detection keys for a detected communicating object,
  comparing the values taken by the common keys between the detecting communicating object and the detected communicating object and in case they are equal or very close to one another, then
  notifying the user, via a signal emitted by the communicating object, that at least one communicating object partially or completely corresponding to the search keys has been detected, and
  connecting the two communicating objects to one another.

The invention thus establishes, by means of a technological device (the communicating object), a connection between the real identity of the user, materialized by the bearing of the activated object, and her/his virtual identities, materialized by all her/his profile accounts. This connection results in the capacity for detecting, identifying, exchanging the data in the profile accounts and connecting two users of the device to one another.

The invention thus makes it possible to identify a user thanks to one single identifier a set of social and/or professional network accounts of the user corresponds to, to automatically connect people having mutual interests to one another, to establish a protected connection between communicating objects without the intervention of users, to make users, who in principle do not know each other, communicate with one another without the intervention of a go-between user, and to extend all the social and/or professionals network accounts of the user with new data collected via said device.

In particular, this extension consists in:
  inviting the contacts identified via said device to join the contact network of the user of said communicating device for each social and/or professional network and/or account in the customer data base concerned,
  notifying the contacts of the contact network of the user about events resulting from the activity(s) he had via her/his device (for example a meeting with another user is passed on to all her/his professional account contacts).

It is thus possible to transpose (the user reports on her/his social account the activity(s) he had by using her/his device) and/or to convert (to virtually trace the real activity of the user by including identity, time, if necessary geography and documentation data) and/or to extend the activity of the user with her/his real activity for each of her/his virtual identities (for example by sending requests for contacts, memorizing if necessary requests for contacts in the social network accounts the user belongs to, automatically updating the existing contacts, for example by memorizing an audio or video text exchange in her/his profile account already containing the contact).

According to an embodiment, the single identifier is determined from a serial number of the communicating object.

According to an embodiment, a user account moreover comprises fields concerning an activity of the communicating object defined by a schedule of the connections to the other communicating objects and/or exchanges via recorded text messages and/or a language of the fields of the user account.

According to an embodiment, the connection established between two communicating objects is a point-to-point connection.

According to an embodiment, the method comprises the step of measuring a distance between the detecting communicating object and a detected communicating object and of passing this distance on to the user of the detecting communicating object.

According to an embodiment, for measuring the distance between communicating objects, it comprises the following steps of:
  synchronizing the clocks of the transponders of the two communicating objects in order to define a reference point common to both transponders,
  emitting in a synchronized and bilateral way a reference signal,
  measuring from the reference point an elapsed time for receiving this reference signal,
  measuring in a reciprocal way phases and gains of received signals corresponding to the reference signal sent,
  filtering parasitic phases, and
  calculating the distance from the filtered phases and from the measured gains of the received signals.

According to an embodiment, the method comprises the step of detecting connection occurrences between the various communicating objects.

According to an embodiment, the method comprises the step of defining a standard profile for search keys and detection keys for the user of the communicating object concerned worked out during a running time,
  comparing the standard profile with a list of detection and search keys of the user accounts stored in the general data base, and
  notifying the user about a relevance level for identified profiles calculated from a comparison between the standard profile and the detection and search keys of the user accounts,
  proposing to each user via her/his communicating object a reciprocal and gradual identification.

According to an embodiment, for establishing the authenticated and protected connection between the communicating objects, the method comprises the following steps of:
  emitting a detection signal towards all the detectable communicating objects, this detection signal containing a datum ciphered by a private key/public key system including the identifier of the detecting communicating object, and
  exchanging data according to protocol 802.11 authenticated and protected by means of the ciphered data exchanged according to protocol 802.15.4,
  frames corresponding to the exchanged data being normalized in order to allow a protected point-to-point connection.

According to an embodiment, the emission of the detection signal is carried out gradually, this graduality is controlled by an algorithm controlling an emission power based on a predetermined number of communicating objects to be detected.

According to an embodiment, the method comprises the step of geolocating communicating objects without any GPS system integrated in said communicating objects.

According to an embodiment, a communicating object having established a connection with a set of communicating objects, and an external radio terminal of WIFI type being accessible by at least one of the communicating objects, it comprises the following steps of:
  locating this terminal by means of an identifier of the terminal in order to obtain the GPS co-ordinates thereof, and
  interpolating estimated positions of the various communicating objects with respect to the terminal with the GPS co-ordinates of said terminal in order to obtain an estimated position of each communicating object.

According to an embodiment, the method comprises the step of transmitting service data concerning a technical configuration of the communicating object and of adapting the connection according to these service data.

According to an embodiment, if a detected communicating object has an accumulator charge state higher than that of the detecting communicating object, the audio and/or video data exchanged are compacted by the detected communicating object.

The invention moreover relates to a communicating object for implementing the connection method according to the invention, characterized in that it comprises processing means including software instructions in particular making it possible to control a detection of other communicating objects, to identify and compare detection and search keys, as well as to notify a user and to establish a connection with other communicating objects.

BRIEF DESCRIPTION OF THE DRAWINGS

The invention will be better understood when reading the following description and examining the annexed Figures. These Figures are given only as an illustration and by no means as a restriction of the invention.

Identical, similar, or analogous elements have the same references throughout the Figures.

DETAILED DESCRIPTION OF EMBODIMENTS OF THE INVENTION

The connection method is implemented by communicating objects O1-ON intended to exchange data between one another as well as a connection platform P.

Figure 2:
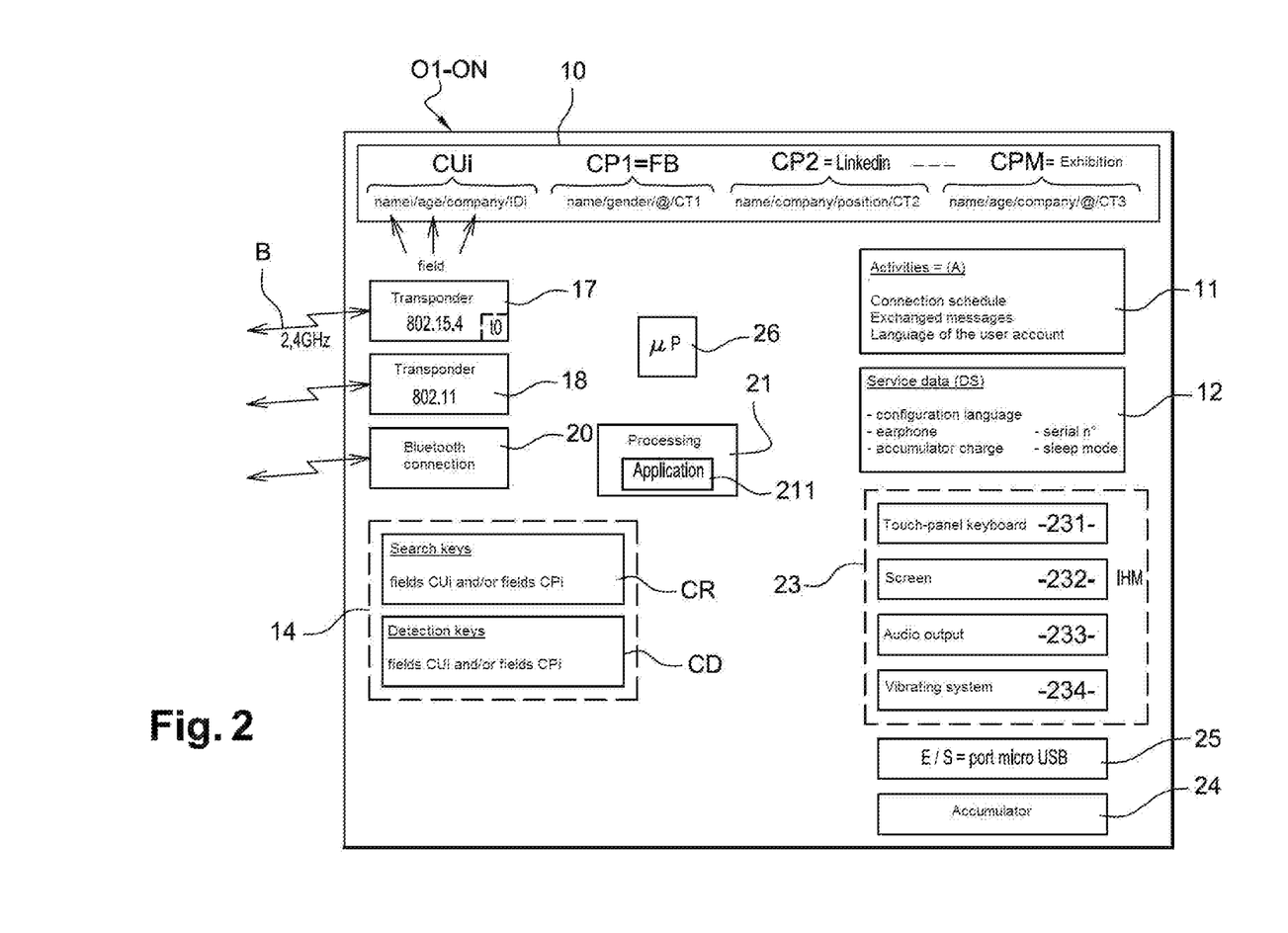
FIG. 2 shows a detailed schematic representation of a communicating object according to the invention.

As shown in FIG. 2, each object O1-ON comprises a memory 10 storing the fields of a user account CU1-CUN of the person holding the communicating object O1-ON. The fields of the user account CU1-CUN comprise fields concerning a single identifier ID1-IDN of the user established preferably from a serial number of the communicating object O1-ON. In the rest of the document, the term 'field' has the usual meaning in the field of data bases, i.e. it is a piece of information taking at least one value among a set of possible values.

The memory 10 also stores fields of profile accounts CP1-CPM that were associated to the user account CU1-CUN when created by the user. The memory 10 thus stores the fields of her/his social and/or professional network accounts and/or an account memorized in a customer data base. The social network accounts are for example accounts such as Facebook (trade mark) or Myspace (trade mark). The professional network accounts are for example accounts such as Linkedin, Viadeo or any other account of the same type. The accounts memorized in customer data bases could be for example accounts managed by the organizer of a professional exhibition or memorized on an administrative server in a large company. Thus, the fields of the profile accounts CP1-CPM comprise in particular fields such as Gender (man or woman), Name, First Name, Age, Email as well as Position of the user of the communicating object O1-ON. The fields of the profile accounts also comprise at least one field concerning the list of first-rank contacts at least of the profile network CP1-CPM. The number and type of the fields of the profile account CP1-CPM will depend of course on the number and type of the profile accounts associated with a given user.

Each communicating object O1-ON comprises a memory 11 storing an activity of the communicating object. This activity is defined by a schedule of the connections to the other communicating objects O1-ON (instant and duration of a connection) and/or the exchanges by means of recorded text messages and/or a language of the values of the fields of the account stored in the memory 10.

Each communicating object O1-ON also comprises a memory 12 containing service data DS concerning the technical configuration of the communicating object. These service data DS thus comprise data concerning the configuration language of the communicating object O1-ON, the presence or absence of a telephone or an earphone connected to the device such as a Bluetooth earphone, an accumulator charge state, a serial number of the communicating object O1-ON, the sleep state of the communicating object O1-ON etc.

Each communicating object O1-ON also comprises a memory 14 storing search keys CR of communicating objects O1-ON corresponding to fields of the user account CU1-CUN sought by the user. The memory 14 also stores detection keys CD of the communicating object O1-ON corresponding to the fields of the user account CU1-CUN whereby the communicating object O1-ON agrees to be detected.

Each communicating object O1-ON comprises a first radio transponder 17 emitting preferably at a frequency of 2.4 GHz according to a protocol derived from protocol 802.15.4. This transponder 17 allows the detection of other communicating objects O1-ON as well as the establishment of a protected connection to the detected communicating objects. This transponder 17 is also used to perform a calculation of the distance between two communicating objects O1-ON, as explained more in details hereafter.

Each communicating object O1-ON also comprises a second transponder 18 working according to protocol 802.11 and allowing the data exchange with other communicating objects in a point-to-point mode as well as data exchanges with the platform in an Access Point mode. In particular, these data consist in values of the fields of the user account CU1-CUN and/or profile accounts CP1-CPM, detection keys CD and search keys CR as well as services data DS.

This transponder 18 also makes it possible to establish an audio and/or video connection between two communicating objects O1-ON.

Preferably, each communicating object O1-ON moreover comprises a communication module 20, for example of Bluetooth type, for the transmission of audio and/or video signals towards peripherals, such as an earphone or a portable telephone during a connection between two communicating objects O1-ON, for the synchronization of the data with a mobile device DN described more in details below, for the access to the platform P by means of this mobile device DN, and for the remote control of the communicating object by means of this mobile device DN.

Each communicating object O1-ON comprises processing means 21, in particular including an application program 211 for controlling the connection to other communicating objects O1-ON including software instructions in particular making it possible to control the detection of the communicating objects O1-ON, to identify and compare search keys CR and detection keys CD in order to show the correspondences as well as to send a notification and establish a connection to other communicating objects O1-ON. The processing means 21 also perform the calculation of the distance between two communicating objects as well as the control of the connection to the platform P.

Each communicating object O1-ON comprises a man-machine interface (IHM) 23 adapted to exchange with the user. This IHM 23 comprises means for entering controls and messages during the connection to the other users, for example a touch-panel keyboard 231. The IHM 23 moreover comprises means for restituting information to the user, for example a visual display unit 232 and/or an audio output 233 connected to a loudspeaker or associated with an earphone for example of the Bluetooth type and/or a vibrating system 234. In a preferred embodiment, the interface has the shape of a touch sensitive screen whose menu layout depends on the fact that the user is a right-handed or left-handed person. Thus, for example, for a right-handed user, the browser will be displayed in the shape of a band placed on the right of the screen while for a left-handed user the browser will be displayed on the left of the screen.

Preferably, each communicating object O1-ON also comprises an accumulator 24 so as to allow an autonomous operation as well as a port 25 of the USB or micro-USB type for controlling inputs/outputs and recharging of the accumulator.

Each communicating object O1-ON moreover comprises a processor 26 adapted inter alia to the execution of the application program 211 for controlling the connection to the other communicating objects O1-ON and to the platform P.

Figure 3:
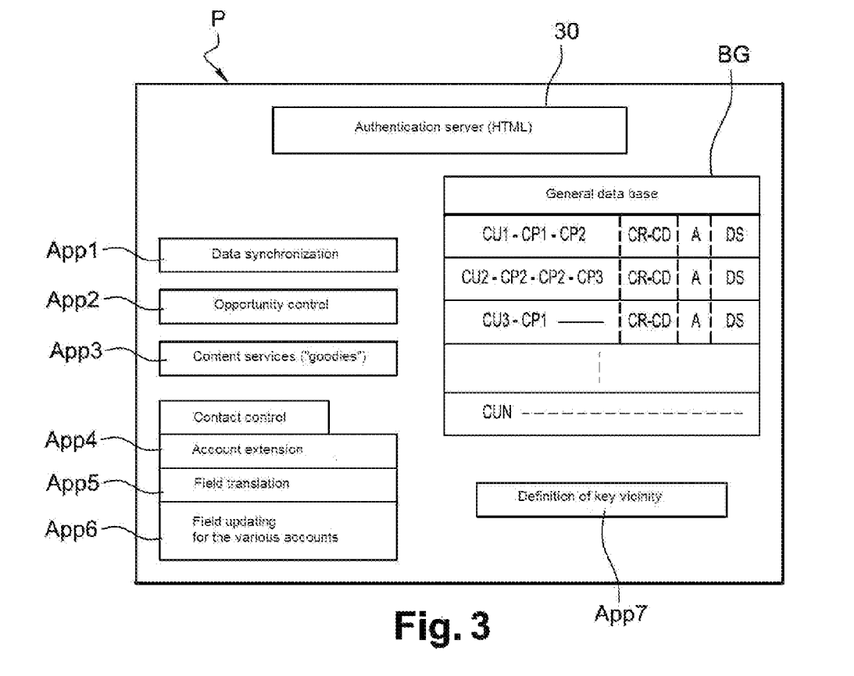
FIG. 3 shows a detailed schematic representation of the connection platform according to the invention.

In addition, as shown in FIG. 3, the platform P comprises an authentication server 30 to which a communicating object O1-ON, a mobile telephone 31, or even a computer 32 will be able to be connected via a Web access of the conventional HTLM type for example to have access to a general data base BG. This general data base BG stores all the user accounts CU1-CUN and the associated profile accounts CP1-CPM. Preferably, the general data base BG also stores the detection keys CD and search keys CR as well as the activities and the service data DS of the various communicating objects O1-ON.

The platform P comprises an application program App1 ensuring the synchronization of the data between the communicating objects O1-ON and the platform P.

The platform P also comprises an application program App2 likely to propose meeting occurrences between users according to standard profiles described more in details hereafter.

The platform P also comprises an application program App3 for controlling the content services called "goodies" as for example animated wallpaper intended to be downloaded by the communicating objects O1-ON for their display when the communicating object O1-ON is carried like a badge.

The platform P also comprises application programs App4-App6 ensuring the control of contacts such as for example an application program App4 making it possible to export data collected by a communicating object O1-ON in order to extend the user profile accounts, an application program App5 making it possible to translate field values of the user accounts CU1-CUN or profile accounts CP1-CPM in order to send them in the language of a detecting communicating object. The application program App5 could be run on the request of the detecting communicating object O1-ON if necessary through an online payment or on an account associated with the communicating object O1-ON. An application program App6 will be able to ensure an updating of the fields of a user on the various accounts.

Preferably, an application program is installed in a mobile device DN such as in particular mobile telephones, or a multi-media object such as a tablet or a game console, or a computer. The function of this application program is in particular:
- to control the communicating object O1-ON from the mobile device DN, and in particular, in order to carry out from the mobile device DN all the user functions normally accessible by the communicating object O1-ON,
- to synchronize all the data of the communicating object O1-ON on the platform P from a synchronization of the mobile device DN with the platform P,
- to notify, by means of a sound and/or visual signal such as for example a musical ringing, when a communicating object O1-ON of interest is in the vicinity.

These functions are fulfilled between the communicating object O1-ON and the mobile device DN by means of a point-to-point connection 802.11 or a Bluetooth connection or another connection such as for example a NFC or even USB connection and between the mobile device DN and the platform P by means of an Access Point connection 802.11 or a protocol for a mobile telephony such as in particular a GSM, UMTS, CDMA or for a wire telephony in case the connection 802.11 would not be available.

Figure 1:
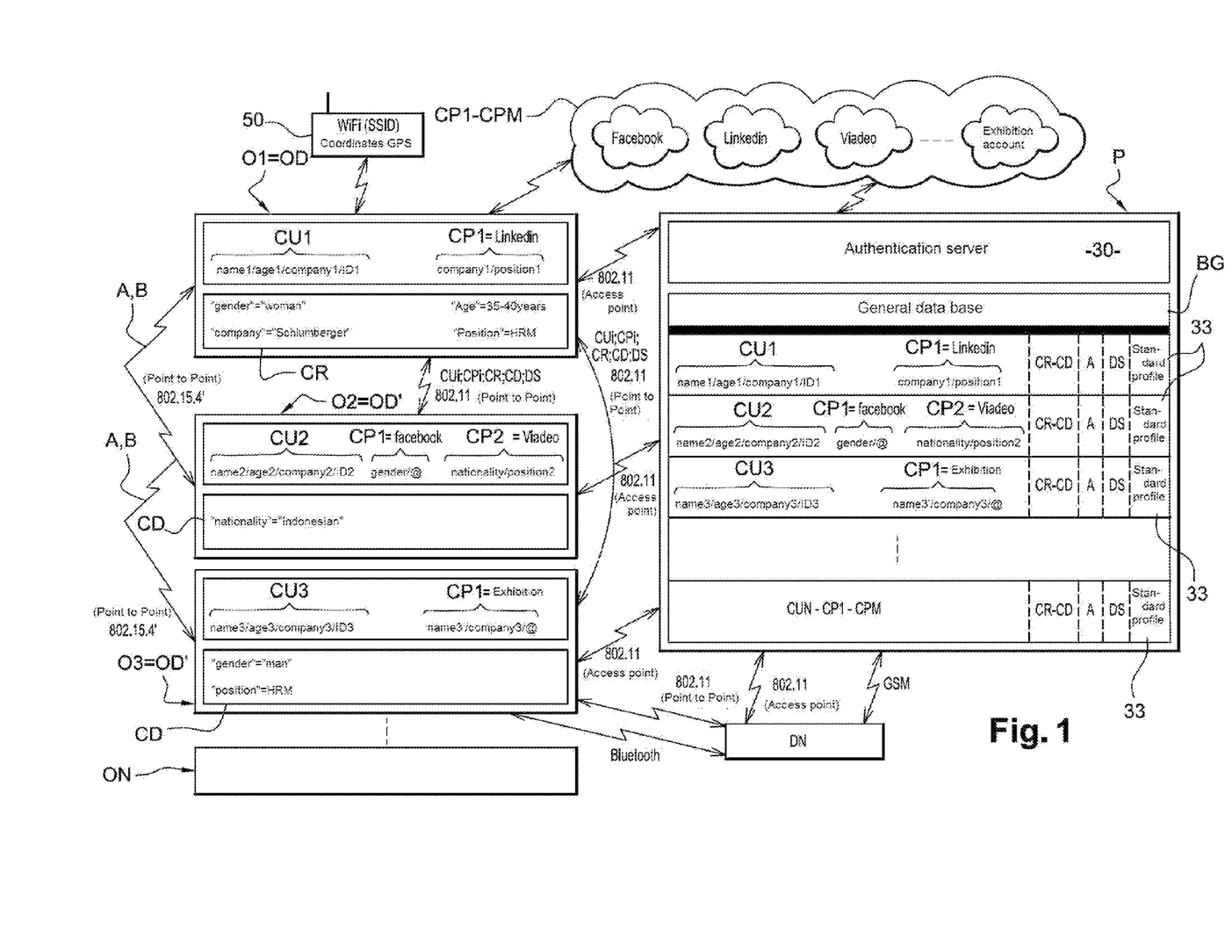
FIG. 1 shows a schematic representation of the communicating objects in relation to a platform within the framework of the connection method according to the invention.
Figure 4:
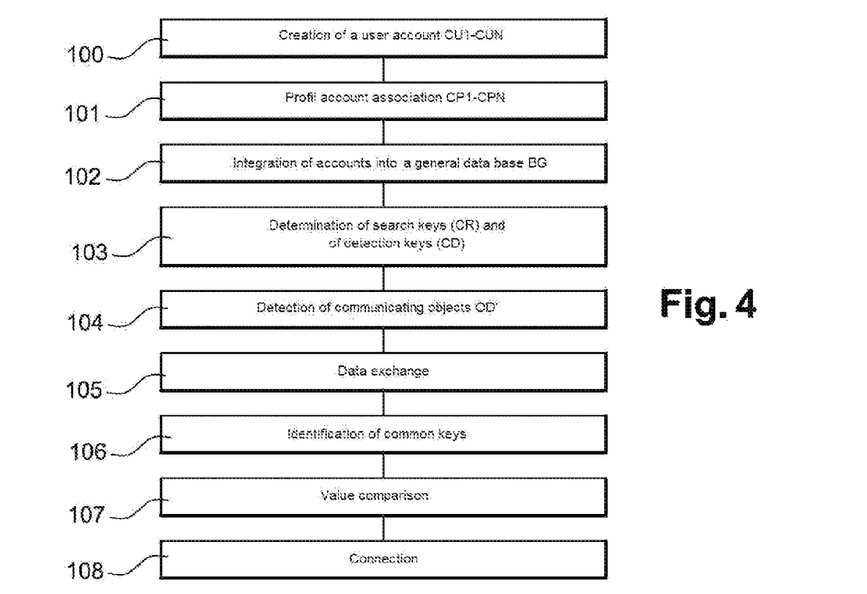
FIG. 4 shows a diagram of the main steps of the connection method according to the invention.

Hereafter it is described, with reference to FIGS. 1 and 4, the steps of the connection method according to the invention. It is noted that in FIG. 1 the communicating objects O1-ON and the platform P are represented in a simplified way for understanding reasons.

In a step 100, a user creates a user account CU1-CUN including a single identifier ID1-IDN of the user obtained from a serial number of the communicating object O1-ON. This serial number is the single identifier of the communicating object. A user identification is thus carried out by means of a single identifier ID1-IDN for each communicating object, which unifies all the identities of the user for her/his profile accounts CP1-CPM. The user account has also at least one field concerning its identity desired by the user of the communicating object and possibly other fields concerning for example her/his position.

In a step 101, the profile accounts CP1-CPM of the user, in particular her/his social and/or professional accounts and/or an account stored in a customer database are associated with the user account CU1-CUN. To associate means to obtain from the social/professional/customer (holder of the profile account Cpi) network an authorization allowing the interconnection between the platform P and the data base of this network, then the importation of the data concerning Cpi in the platform and then their downloading towards the communicating object O1-ON. Alternatively, in case that the method is implemented without any platform P, the importation of the data is carried out directly towards the communicating object O1-ON. As previously indicated, the profile accounts hosted by the platform P, the communicating object O1-ON and the mobile device DN include at least the list of first-rank contacts of the network of each CPi. Thus, for example, a LinkedIn (trade mark) account will be associated with a first user account CU1 corresponding to a first communicating object O1, while a Viadeo (trade mark) account and a Facebook (trade mark) account will be associated with a user account CU2 corresponding to a second communicating object O2. An account stored on an exhibition server will be associated with a third user account CU3 corresponding to a third communicating object O3. In the same way, if the user owner of CU1 of O1 has at the same time four accounts for example a Facebook account, a Viadeo account, a Linkedin account and an account stored on an exhibition server, the data of these four accounts are stored in the fields CP1 to CPM.

In a step 102, the user accounts CU1-CUN and the profile accounts CP1-CPM associated with all the users are integrated into the general data base BG. To integrate means to link each profile account Cpi imported from the social/professional/customer network concerned (thanks to the authorization given) to the single identifier ID1-IDN.

The user then determines in a step 103 search keys CR for communicating objects corresponding to fields of the user account CU1-CUN sought by the user. The user also determines detection keys CD for the communicating object O1-ON corresponding to the fields of the user account CU1-CUN whereby the communicating object O1-ON agrees to be detected.

The communicating object O1-ON, so-called detecting communicating object OD, then detects in a step 104 the detectable communicating objects O1-ON i.e. objects able to be detected or so-called detected objects OD'. Indeed, a communicating object O1-ON can be put in a sleep mode by the user in order not to be disturbed via a functionality whose state constitutes a service data DS. If this functionality is activated, the communicating object O1-ON could not be detected by the communicating objects in the vicinity; whereas, if this functionality is deactivated, the communicating object O1-ON can be detected by the other objects in the vicinity.

The detection step is carried out within the framework of a connection authenticated and protected without requesting neither the user of the detecting communicating object OD, nor the users of those communicating objects O1-ON that can be detected OD'. In our example the communicating object O1 is considered as the detecting communicating object OD and the communicating objects O2 and O3 as the detected communicating objects OD'.

For this purpose, a detection signal A is emitted by the detecting communicating object OD towards all the detectable communicating objects OD'. This signal A is emitted in accordance with the standard 802.15.4' derived from 802.15.4. It is a standard derived from the standard 802.15.4 in that it allows a point-to-point connection between two communicating objects within a framework not envisaged by protocol 802.15.4. This detection signal A contains a data ciphered by a private key/public key system including the identifier ID1-IDN of the detecting communicating object OD. Preferably, the detection signal A is emitted gradually, this graduality being controlled by an algorithm controlling the emission power based on a predetermined number of objects O1-ON to be detected. Thus, the power of the signal A increases as long as the number of objects O1-ON to be detect is not reached. This number is for example equal to ten communicating objects O1-ON. In an alternative embodiment, it could be of course higher or lower than ten, for example equal to two as in the example, according to the application. The detection of the communicating objects O1-ON could be carried out for example within a radius of about 100 meters.

In a step 105, the exchanges of all or part of the service data DS and/or data concerning the fields of the user accounts CU1-CUN and profile accounts CP1-CPM including the lists of contacts as well as the detection CD and search CR keys are carried out between the detecting communicating object OD and detected communicating objects OD'. These exchanges are carried out with protocol 802.11 authenticated and protected by means of the ciphered data exchanged according to protocol 802.15.4'.

The frames corresponding to the data exchanged between the detecting communicating object OD and the detected communicating objects OD' are normalized i.e. the structure of the frames is predefined in order to allow the establishment of a protected point-to-point connection using protocol 802.11. Thus, the connection between the various communicating objects O1-ON is an appropriate connection which does not require the definition and the intervention of a network exchange coordinator as it is the case with "access point" systems. Such a connection between the communicating objects O1-ON makes it possible to easily extend the network of communicating objects O1-ON without needing a router or a preexisting telecommunication structure.

Then, the method comprises the step 106 of identifying common keys between the search keys CR for the detecting communicating object OD and the detection keys CD for the detected communicating object(s) OD'. Thus, for example, if the detecting communicating object O1 has such search keys as "gender"="woman", "age"="35-40 years", "company"="Schlumberger", "position"="HRM", and the second communicating object O2 has such a detection key as "nationality"="Indonesian" and the third communicating object O3 has such detection keys as "gender"="man", "age"="30 years" and "position"="HRM" then at the end of the step 106 the method shows that there is no common key between the first communicating object O1 and the second communicating object O2 and two common keys ("gender" and "position") between the first communicating object O1 and the third communicating object O3.

In a step 107, the communicating objects compare the values taken by the common keys between the detecting object OD and the detected object OD'. In case that the search keys CR of the detecting communicating object OD are equal or close to the detection keys of the detected communicating object OD', then the user is notified in a step 108 via a sound and/or visual and/or tactile (vibrator mode) signal emitted by the communicating object OD that the communicating object OD' corresponding, partially or completely, to her/his search keys CR has been detected.

In fact, the first O1 and the third O3 communicating object present a different common key (gender), an identical common key and a close common key (age). The number of identical keys could be displayed for each detected communicating object OD'. The proximity of the keys is preferably defined by the platform P via an application program App 7. Thus, for example, the proximity of the age range 35-40 is defined by the ranges 30-35, 35-40 and 40-45. Such a position as CEO (Chief Executive Officer) could be also regarded as close to the position COO (Chief Operating Officer).

Then, a connection is established in a step 108 between the communicating objects O1-ON having common interests, in fact the communicating objects O1 and O3. This connection could be of the audio and/or video type. It is also possible to connect the users via exchanges of text messages whose contents could be saved in fields concerning the activity of the communicating object O1-ON. The instant of the connection, the contacted person, as well as its duration could also be saved in the fields of the schedule stored in the memory 11.

Moreover, all or part of the data collected from the activity of the communicating object O1-ON with the detected objects OD' are, in a step 109, transposed and/or converted and/or extended by the physical activity of the user, her/his activity on each of her/his virtual identities (for example emitting requests for contacts, storing if necessary requests for contacts into the accounts of social networks the user belongs to, updating in an automatic way existing contacts for example: storing if necessary an audio or video text exchange into her/his profile account already containing the contact).

It is noted in addition that the connection between the communicating objects O1-ON and the platform P in particular for the updating of the data of the various accounts could be carried out in an "access point" mode via protocol 802.11.

Figure 5:
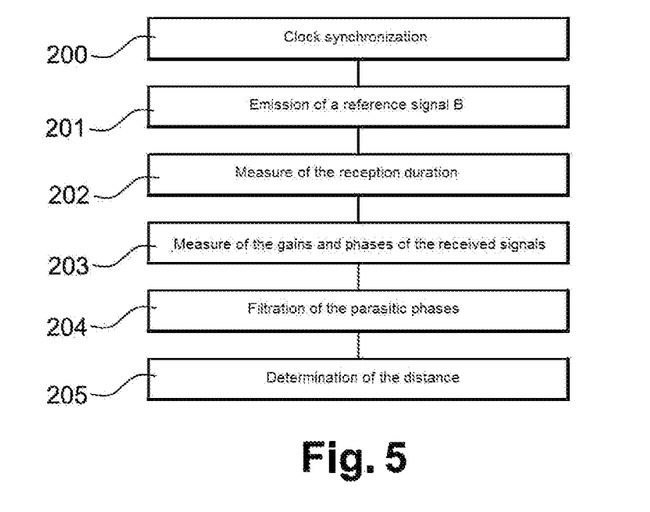
FIG. 5 shows a diagram of the steps of measuring the distance between a detecting communicating object and a detected communicating object implemented in the method according to the invention.

Preferably, the distance between the detecting communicating object OD and a detected communicating object OD' is measured and notified to the user of the detecting communicating object OD so that (s)he will be easily able to meet the person of interest if the latter would be close to her/him.

For this purpose, the synchronization of the clocks of the transponders 17 of the two communicating objects O1-ON is carried out in a first step 200 so as to define a reference point t0 common to both transponders 17. Then, a reference signal B is emitted in a step 201 in a synchronized and bilateral way, i.e. each transponder 17 emits this reference signal B. The elapsed time for the reception of this reference signal B from the reference point t0 is measured in a step 202 with the help of the processing means 21 of the communicating objects O1-ON.

The phases and the gains of the received signals corresponding to the signal B are then measured in a reciprocal way in a step 203. Parasitic phases are filtered in a step 204. The distance between the two communicating objects O1-ON is then determined in a step 205 from the filtered phases and measured gains.

In addition, the communicating object can establish a connection with a mobile device DN such as a mobile telephone or computer via a point-to-point connection 802.11 via the transponder 18 or a Bluetooth connection via the transponder 20 or another connection such as for example NFC. The object of this connection is:

updating the resident data in the communicating object O1-ON if the set of data in the mobile device DN is more recent, updating the data of the mobile device DN if the set of data of the communicating object O1-ON is more recent, or establishing a text, audio, video connection between two users with the help of the multimedia capacities of the mobile device DN, or controlling the communicating object O1-OD with the help of the mobile device DN.

The mobile device DN can also establish a connection 802.11 of the Access Point type with the platform P in order to synchronize the set of data of the communicating object O1-OD hosted by the mobile device DN, update and/or extend and/or convert, directly or via the platform P, the profile accounts CP1 to CPM of the user of the communicating object.

If the connection 802.11 of the Access Point type is not available, the application program developed for the mobile device DN can be based on a connection of the GSM type so as to give these functionalities.

Figure 6:
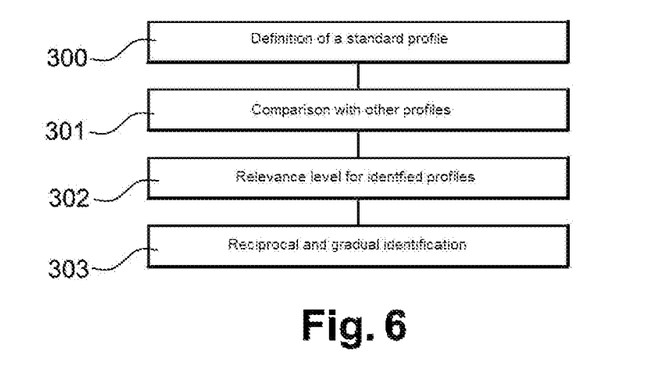
FIG. 6 shows a diagram of the steps of the method according to the invention implemented for detecting connection occurrences between two communicating objects.

In an improvement of the method, connection occurrences are detected between the various communicating objects O1-ON.

For this purpose, with reference to FIG. 6, the platform P defines in a step 300 a standard profile 33 for search keys CR and detection keys CD for the user of the communicating object O1-ON concerned obtained during the time of use. This standard profile 33 could be defined from the frequencies of the values taken by each field selected to define the detection CD and search CR keys and to deduce therefrom an average search and detection key. This standard profile 33 is compared in a step 301 with the list of the search CR and detection CD keys of the user accounts CU1-CUN stored in the general data base BG. If necessary, this comparison could be limited only to the users agreeing beforehand to be contacted.

In a step 302, the platform P then notifies the user about a relevance level for identified profiles calculated from a comparison between the standard profile 33 and the search CR and detection CD keys of the other user accounts. It is then proposed to each user, in a step 303, a reciprocal and gradual identification. Reciprocal and gradual identification means an identification in which a user will disclose to the other user some of her/his fields after one another provided that the other user does the same.

In addition, the communicating objects O1-ON will be able to adapt the connection according to the service data DS exchanged between the communicating objects O1-ON. For example, if the communicating objects O1-ON are provided with an earphone, it will be proposed an audio connection between the users. If the detected communicating object OD' has an accumulator charge state higher than that of the detecting communicating object OD, the audio and/or video data could be compacted by the detected communicating object OD'.

If the default language for displaying the profile data stored by the detected communicating object OD' is not that of the detecting communicating object OD, then the detecting communicating object OD requires the detected object OD' to transmit the profile data in its default language for displaying the profile data. If the communicating object OD' or OD does not have these data in this language, it can ask for a translation thereof via a connection to the platform P and the implementation of a corresponding translation application program.

In an embodiment of the method, the detected communicating objects O1-ON are geo-located without any GPS system integrated in the communicating objects O1-ON.

For this purpose, a communicating object O1-ON has first established a connection with a set of communicating objects O1-ON. In addition, an external radio terminal 50 of the WIFI type is accessible by at least one of the communicating objects O1-ON. Under these conditions, the terminal 50 is located by means of its identifier, for example the SSID number, in order to obtain the GPS co-ordinates therefrom. Then, estimated positions of the various objects with respect to the terminal 50 with the GPS co-ordinates of said terminal 50 are interpolated so as to obtain an estimated position of each communicating object O1-ON.

Of course, the person skilled in the art will be able to change the previously-described connection method within the scope of the invention. In particular, the data bases or the memories considered as distinct from each other could form in an alternative embodiment a single data base or memory. In an alternative embodiment, the memory or the data base BG considered as a single one could be, in an alternative embodiment, divided into several memories or data bases containing each a part of the data of the single memory or data base.

The invention claimed is:

1. Method for connecting users using at least two communicating objects, comprising the steps of:
    creating, for each communicating object, a user account comprising at least one single identifier field for identifying a user associated with a communicating object on a hardware server;
    associating at least one already existing user's profile account on a profile account network to the user account associated with the user by the hardware server by:
        obtaining, from an holder of the profile account network, an authorization allowing an interconnection between the hardware server and a database of a corresponding network different from a server database;
        importing data concerning an already existing user's profile in the server database;
        downloading the data towards a corresponding communicating object to unify all identities of the user for said at least one already existing user's profile account to a single identifier field of said corresponding communicating object; and
        wherein said at least one already existing user's profile account comprises at least one account among an account of a social network, an account of a professional network or an account stored in a customer database;
    incorporating and storing the user accounts and the associated profile account of all users in a general database by the server;
    determining search keys for a communicating object sought by the user's communication object, the search keys corresponding to fields of the user account or the associated profile account;
    determining detection keys for the communicating object, the detection keys corresponding to the fields of the user account or the associated profile account and permitting the communication object to be detected by other communicating objects;
    detecting detectable communicating objects by a detecting communicating object within a framework of an authenticated and protected connection without the intervention of the user of the detecting communicating object nor the users of detectable communicating objects;
    exchanging fields of the user accounts or associated profile accounts, the detection keys and the search keys between the detecting communicating object and the detected communicating objects;

identifying common keys between the search keys of the detecting communicating object and the detection keys of a detected communicating object, comparing values of the common keys between the detecting communicating object and the detected communicating object by at least the detecting communicating object;

in response to a determination that the values of the common keys are equal to or within predefined proximity of each other, notifying the user of the detecting communicating object that at least one communication object partially or completely corresponding to the search keys has been detected by a signal emitted by the detecting communicating object and connecting the detecting communication object and the detected communication object;

inviting contacts identified by the user's communicating object to join a contact network of the user for each user's profile account; and notifying the contacts of the contact network of the user about events resulting from an activity the user had through the user's communicating object, thereby transposing a real life activity of the user using the user's communicating object to each virtual identity corresponding said each user's profile account.

2. Method according to claim 1, further comprising the step of determining the single identifier from a serial number of the communicating object.

3. Method according to claim 1, wherein the user account further comprises activity fields for storing activities of the communicating object comprising at least one of the following: connections to the other communicating objects, exchanges with other communicating objects via recorded text messages, or a language used in the fields of the user account.

4. Method according to claim 1, further comprising the step of establishing a point-to-point connection between two communicating objects.

5. Method according to claim 1, further comprising the steps of measuring a distance between the detecting communicating object and the detected communicating object, and notifying the user of the detecting communicating object of the distance.

6. Method according to claim 5, wherein the step of measuring further comprises the steps of:
synchronizing clocks of transponders of the detecting communication object and the detected communicating objects to define a reference point common to both transponders;
emitting a reference signal in a synchronized and bilateral way by each transponder;
measuring from the reference point an elapsed time for receiving the reference signal emitted by a transponder of one of either detecting or detected communicating object by the other communicating object;
measuring, in a reciprocal way, phases and gains of the reference signal received by one of either detecting or detected communication object, the received reference signal corresponding to the reference signal emitted by the transponder of other communicating object;
filtering parasitic phases of the received reference signal; and
calculating the distance from the filtered phases and from the measured gains of the received signals.

7. Method according to claim 1, further comprising the step of detecting connection occurrences between the communicating objects.

8. Method according to claim 7, further comprising the steps of:
defining a standard profile of the search keys and the detection keys utilized by the user of the communicating object by the server;
comparing the standard profile with a list of detection and search keys of the user accounts stored in the general database by the server;
notifying the user of a relevance level of identified profiles determined from a comparison between the standard profile, and the detection and search keys of the user accounts stored in the general database by the server; and
proposing to each user a reciprocal and gradual identification via the communicating object by the server.

9. Method according to claim 1, further comprising the step of establishing the authenticated and protected connection between the communicating objects by:
emitting a detection signal towards all the detectable communicating objects by the detecting communicating object, the detection signal comprising a datum ciphered by a private key/public key system including the identifier of the detecting communicating object;
exchanging data according to protocol 802.11 authenticated and protected by the ciphered data exchanged based on protocol 802.15.4; and
normalizing frames corresponding to the exchanged data to allow a protected point-to-point connection between the detecting communicating object and the detected connecting objects.

10. Method according to claim 9, further comprising the step of emitting the detection signal gradually by controlling an emission power of the detection signal based on a predetermined number of communicating objects to be detected.

11. Method according to claim 1, further comprising the step of geo-locating communicating objects having no integrated GPS system.

12. Method according to claim 11, wherein a communicating object has a connection established with a set of communicating objects; and wherein an external WIFI radio terminal is accessible by at least one of the communicating objects; and further comprising the steps of:
locating the external WIFI radio terminal by an identifier of the terminal to obtain GPS co-ordinates of the terminal; and
interpolating estimated positions of the communicating objects respect to the terminal with the GPS co-ordinates of the terminal to obtain an estimated position of each communicating object.

13. Method according to claim 1, further comprising the steps of transmitting service data relating to a technical configuration of the communicating object and adapting the connection according to the service data.

14. Method according to claim 13, further comprising the step of compacting audio data, video data or audio/video data exchanged between the detected communicating and the detecting communication object by the detected communicating object if it has an accumulator charge state higher than that of the detecting communicating object.

15. Method of claim 1, wherein the profile account is one or more of the following: a professional network account, a social network accounts or an account memorized in a customer database.

16. A communicating object for implementing the connection method according to claim 1, comprising a processor and computer executable code comprising instructions for the processor to control a detection of other communicating objects, to identify and compare detection and search keys, to notify a user and to establish a connection with other communicating objects.

\* \* \* \* \*